United States Patent
Mahr et al.

[11] Patent Number: 5,912,543
[45] Date of Patent: Jun. 15, 1999

[54] CIRCUIT HAVING A DIGITAL CONTROLLER FOR OPERATION OF A SYNCHRONOUS T MOTOR

[75] Inventors: Peter Mahr, Königsfeld; Gerhard Reiner, Villingen-Schwenningen, both of Germany

[73] Assignee: Deutsche Thomson-Brandt GmbH, Villingen-Schwenningen, Germany

[21] Appl. No.: 08/733,421

[22] Filed: Oct. 18, 1996

[30] Foreign Application Priority Data

Nov. 16, 1995 [DE] Germany ............... 195 42 713

[51] Int. Cl.⁶ .................................................. H02P 1/46
[52] U.S. Cl. .................... 318/705; 318/718; 318/719
[58] Field of Search .................................. 318/712, 715, 318/717, 705, 718, 719, 811, 812

[56] References Cited

U.S. PATENT DOCUMENTS

| | | | |
|---|---|---|---|
| 4,223,261 | 9/1980 | White | 318/721 |
| 4,259,628 | 3/1981 | Iwakane et al. | 318/799 |
| 4,710,827 | 12/1987 | Okita | 360/10.1 |
| 4,929,879 | 5/1990 | Wright et al. | 318/696 |
| 5,319,290 | 6/1994 | Yoshino et al. | 318/254 |

FOREIGN PATENT DOCUMENTS

| | | | |
|---|---|---|---|
| 324 396 A2 | 7/1989 | European Pat. Off. | H02P 6/02 |
| 3012833 C2 | 10/1981 | Germany | H02P 6/18 |
| 4025035 | 2/1992 | Germany | H02P 7/63 |
| 4204351 A1 | 8/1993 | Germany | H02P 6/02 |
| 4323504 | 2/1995 | Germany | H02P 6/10 |
| 2239705 | 9/1990 | Japan | H03B 28/00 |
| 2135078 | 8/1984 | United Kingdom | H02P 5/28 |
| 2188801 | 10/1987 | United Kingdom | H02P 8/00 |

OTHER PUBLICATIONS

Lehmann, R. Technik burstenloser Servoantriebe. In: Elec-tronik 21/13. 10 1989, S. 96–100; Firmenschrift: Siemens, Best.nr E 6430/1003 In: Sonderdruck aus Fernseh–und Kino–Technik, 26, 1972, H.9, S. 326–331.
Copy of Search Report.
S.A. Schweid, et al., "Pulse–width Modulation Control of Brushless Motors," *Xerox Disclosure Journal*, vol. 16, No. 3, May/Jun. 1990, p. 155.
EPO Search Report for counterpart EPO application number 96117798.7.

*Primary Examiner*—William M. Shoop, Jr.
*Assistant Examiner*—Kim Lockett
*Attorney, Agent, or Firm*—Joseph S. Tripoli; Frederick A. Wein; Daniel E. Sragow

[57] ABSTRACT

Electronic circuit having a digital controller operation of a synchronous motor.

Precision motors for driving, for example, a video head drum in video recorders are normally designed as externally commutated synchronous motors. These motors are driven with square-wave voltages by a digital controller (CON), whose circuitry can easily be implemented.

The object of the present invention is to specify an electronic circuit of the type mentioned initially for controlling a synchronous motor, which enables good synchronism and the motor to be operated with little electrical noise.

This object is achieved in that the synchronous motor is driven by sinusoidal signals, a separate control signal from the controller (CON) influencing the amplitudes of the drive signals (U1, V1, W1). A regulating signal for regulating the synchronous motor is produced by a sensor (GE) which is arranged on the synchronous motor, which regulating signal produces a fixed phase relationship between rotor revolution and drive signals. The circuit can be implemented in a simple manner and manages without any digital/analogue converters.

The applications which result are, in particular, for digital video recorders and for camcorders.

14 Claims, 3 Drawing Sheets

CIRCUIT HAVING A DIGITAL CONTROLLER FOR OPERATION OF A SYNCHRONOUS T MOTOR

The invention relates to a circuit having a digital controller for operation of a synchronous motor.

BACKGROUND OF THE INVENTION

Precision motors for driving, for example, a video head drum in video recorders are normally designed as externally commutated synchronous motors. These motors are driven with square-wave voltages by a digital controller, whose circuitry can easily be implemented.

The motor is designed, for example, with a rotor, which is designed as a disc magnet with two pole pairs. It is mounted such that it can rotate at a short distance above the stator coil, which is split into three coils, which are offset through 120°. A magnetic return path which is mounted on the same axis guides the lines of force through the stator coils at right angles.

It is disadvantageous in the case of this motor drive that high currents occur in particular at the switching edges of the square-wave signals, and can lead to severe noise being produced, as well as to electrical interference. In addition, the torque profile is not sufficiently uniform. This is problematic, in particular at high rotation speeds of 9000 revolutions per minute.

SUMMARY OF THE INVENTION

The object of the present invention is to specify a circuit of the type mentioned initially for controlling a synchronous motor, which avoids these disadvantages.

The circuit for operation of the synchronous motor contains a digital controller whose output signals, which are used to drive the coils of the synchronous motor, are converted in the circuit into sinusoidal signals. The amplitude of these drive signals is influenced in the circuit by a separate control signal from the controller.

The circuit furthermore contains a sensor which is arranged on the synchronous motor and produces a regulating signal for regulating the synchronous motor, which regulating signal allows the movement sequence of the rotor to be identified.

A square-wave signal which is used to drive a coil of the synchronous motor is initially converted in an integrator into a triangular waveform signal. This triangular waveform signal is subsequently converted, in a low-pass filter, into a sinusoidal signal.

The sinusoidal signals result in the motor coils being driven softly, and this produces a uniform torque for the rotor. The synchronous motor is operated in a two-quadrant mode in which all three coils are always active and which enables rapid acceleration and braking.

The amplitude of a drive signal can be regulated, for example, by means of a multiplier to which the control signal is applied. The control signal is advantageously a pulse-width-modulated signal, by means of which the multiplier chops the drive signal. The harmonics which are produced in the process are cancelled out by the low-pass filter which is arranged downstream of the multiplier. In this way, complex digital-analogue conversion of the control signal is avoided.

The sensor, which is arranged on the motor, produces digital pulses which indicate the exact angular position and the speed of revolution of the rotor and can be processed directly by the digital controller. A generator in the controller is synchronized by the pulses during operation. The three drive signals can be produced in a simple manner in the controller from the generator signals, by means of a 3-bit counter and a downstream decoder.

The electronic circuit can be designed cost-effectively, the analogue section and the digital section being connected to one another without any analogue-digital or digital-analogue converter. In addition, high efficiency is achieved. Applications for the electronic circuit result, in particular, for digital video recorders and for camcorders, but other applications are also possible, for example for disk drives in computers or for compact disk drives.

BRIEF DESCRIPTION OF DRAWINGS

The invention will be explained in the following text by way of example with reference to a table and to drawings, in which.

DETAILED DESCRIPTION OF THE INVENTION

Figure 1:
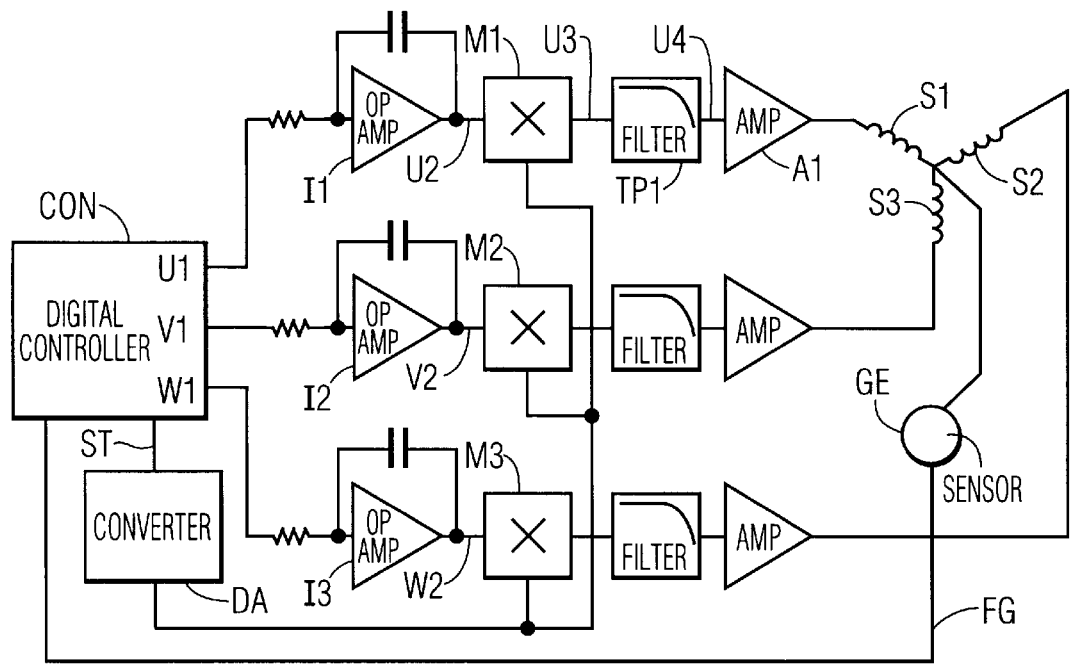
FIG. 1 shows a circuit for driving a three-phase synchronous motor.

FIG. 1 illustrates a circuit having a digital controller CON for operation of a synchronous motor which has three coils S1, S2 and S3. A sensor GE, which is arranged on the synchronous motor, produces a regulating signal FG during operation, which regulating signal FG is supplied to the controller CON. Three digital drive signals U1, V1 and W1 are produced, for operation of the motor, in the controller CON. These square-wave signals U1, V1, W1 are in each case converted into triangular waveform signals U2, V2, W2, by means of a downstream, suitably designed integrator I1, I2, I3.

The three drive signals U1, V1, W1 are each phase shifted by 120° with respect to one another. The phase shift is maintained in each of the individual stages of the circuit. The processing of the drive signals U1, V1, W1 in the circuit is in each case identical and for this reason only the further processing of the signal U2 for one phase will be described in the following text.

The amplitude of the output signal U2 of the integrator I1 is influenced by a downstream multiplier M1. Its output signal U3, which likewise has a triangular waveform, is subsequently converted, in a low-pass filter TP1, into a sinusoidal signal U4 and is amplified by an amplifier A1 before being applied to the coil S1 of the synchronous motor.

Figure 2:
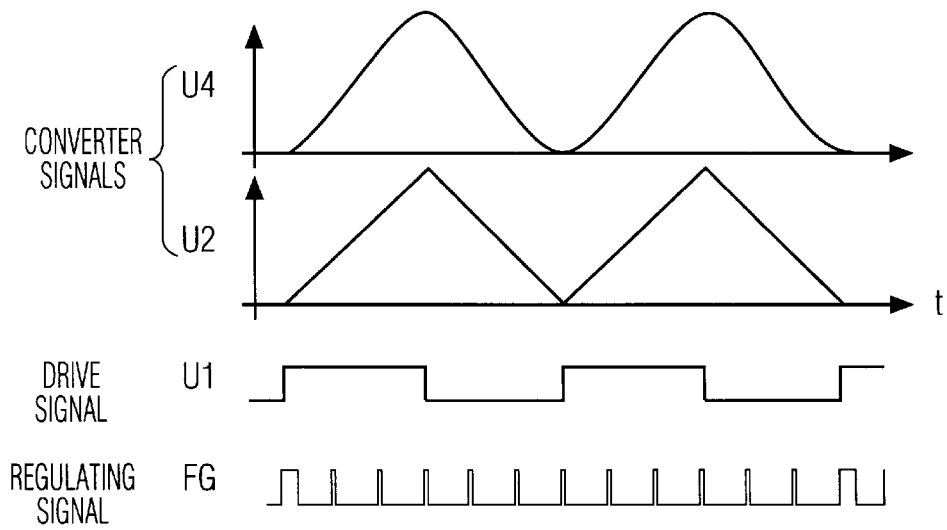
FIG. 2 shows the electronic signals which are produced in the circuit for one phase.

FIG. 2 shows the drive signal U1 together with the converted signals U2 and U4 and the regulating signal FG of the sensor GE, plotted with respect to time. The figure shows the phase synchronicity and the signal waveforms of the said signals. The synchronous motor is operated with synchronous phase by the controller CON, and its speed of revolution is controlled, by the regulating signal FG as will be described further below.

The amplitudes of the signals (and the currents) which are applied to the coils S1, S2 and S3, and thus the speed of revolution of the rotor are regulated by a separate control signal ST, which is in each case applied to the multipliers M1, M2 and M3. In this exemplary embodiment, the control signal ST is converted from digital form to analogue in a digital-analogue converter DA before it can be processed by the analogue multipliers M1, M2, M3.

When the motor starts, the controller CON autonomously produces three square-wave signals U1, V1, W1, shifted through 120°, at a low frequency. If the control variable ST is sufficiently large, then the rotor starts to follow the applied rotating field and is accelerated up to its rated rotation speed.

Figure 3:
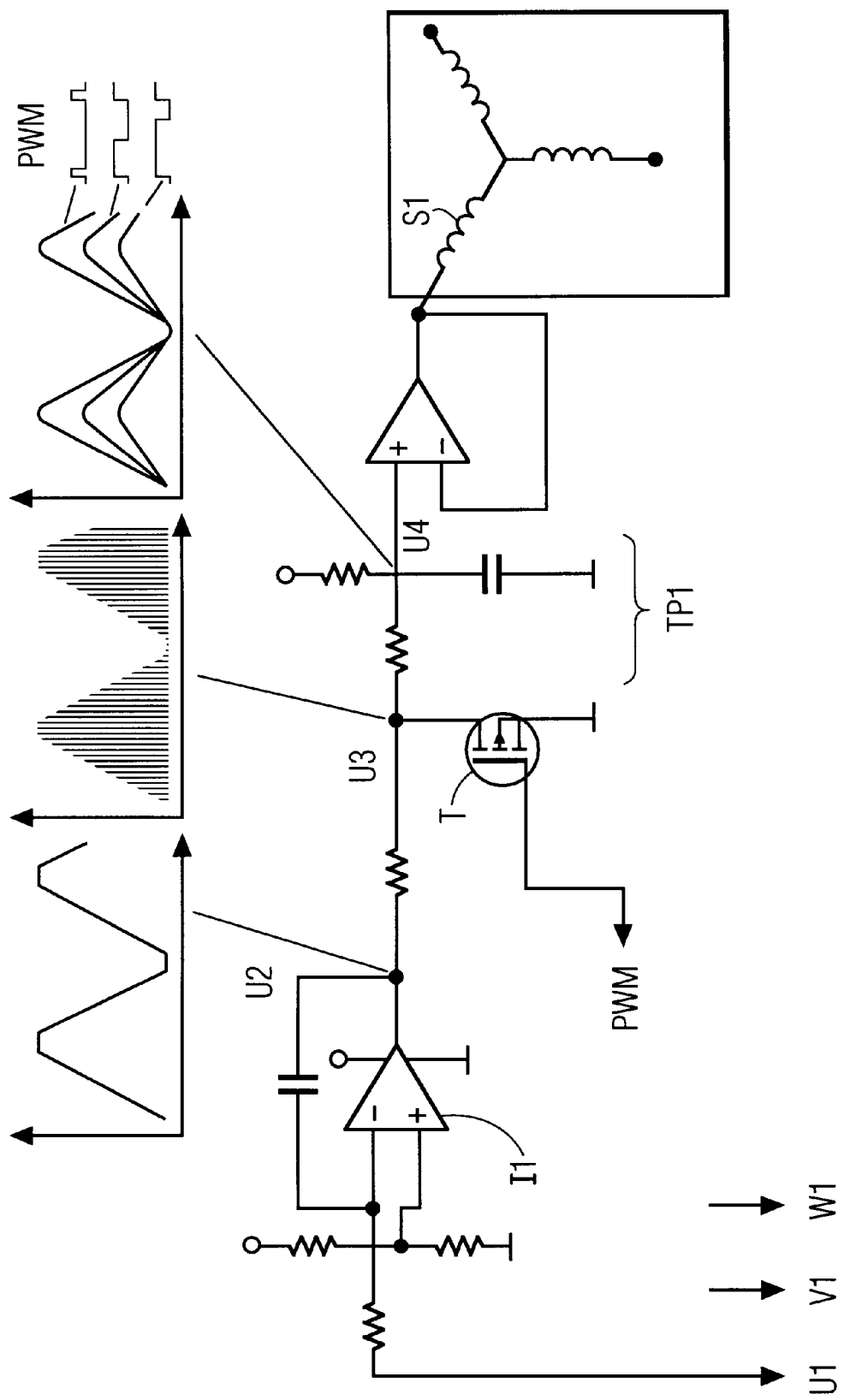
FIG. 3 shows a circuit for one phase.

An advantageous exemplary embodiment of a circuit for conversion of the square-wave drive signal U1 into a sinusoidal signal U4 will be described with reference to FIG. 3.

In this case, the integrator I1 is an appropriately wired operational amplifier, which converts the drive signal U1 into a slightly trapezoidal triangular waveform signal U2. The downstream multiplier M1 comprises a field-effect (FET) transistor T, which chops the analogue output signal of the integrator I1 in time with a pulse-width-modulated signal PWM. In this case, a High level at the transistor T results in the oscillation being short-circuited, while a Low level results in the oscillation continuing at its original amplitude. An appropriately designed low-pass filter TP1 filters out of the signal U3 both the high-frequency harmonics of the PWM signal and the harmonics of the triangular waveform signal. The waveform of the signals U2, U3 and U4 is illustrated in the upper part of FIG. 3.

The output signal of the low-pass filter covers TP1 is thus an analogue sinusoidal signal whose amplitude is inversely proportional to the duty ratio of the pulse-width-modulated signal PWM. In this way, it is possible to avoid an expensive digital-analogue converter DA (FIG. 1) and a complex analogue multiplier. In addition, the digital pulse-width modulation means that there are no circuit tolerances. The conversion of the square-wave signal U1 via a triangular waveform signal U2 into a sinusoidal signal U4 has the advantage that regulation by the transistor T is active throughout the entire oscillation period. This would not be true with a square-wave signal, since the signal is zero for 50% of the time in this case. The triangular waveform signal U2 can, in particular, also be flattened in a trapezoidal shape, as is illustrated in FIG. 3.

A power amplifier in a bridge circuit now passes the drive signal U4 directly to the coil S1. This bridge output stage causes the motor to operate in the two-quadrant mode, that is to say the circuit can both actively accelerate and actively brake. In consequence, very fast and precise changes in rotation speed are possible.

Figure 4:
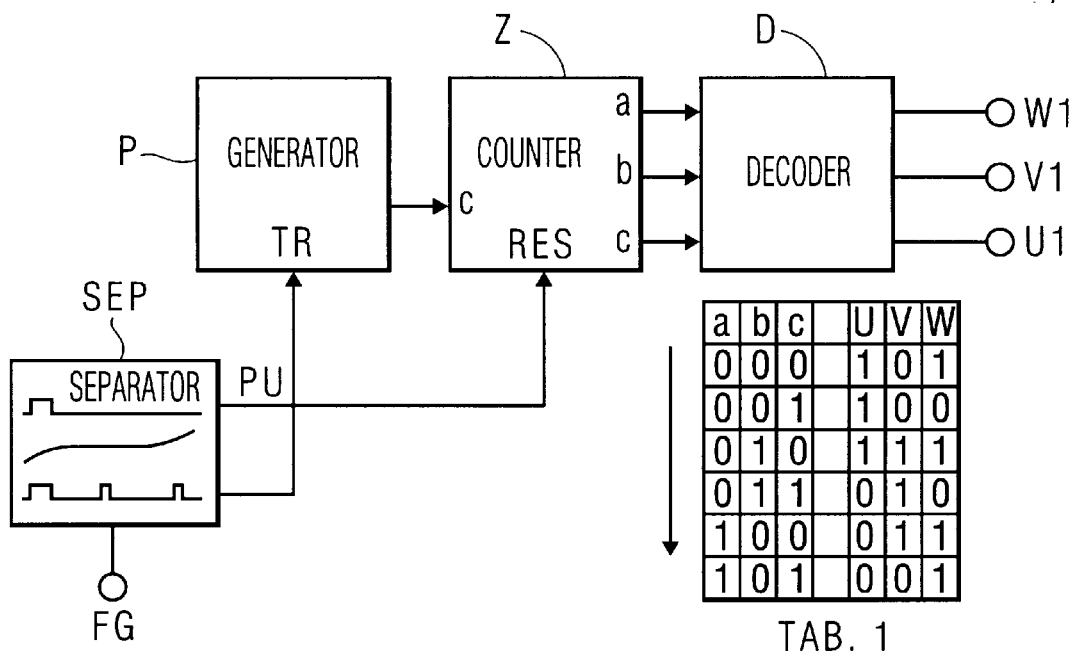
FIG. 4 shows the design of a digital controller.

The design of the digital controller CON (FIG. 1) will be described in more detail with reference to FIG. 4. It contains a generator P, which oscillates at a fundamental frequency of about 18 Hz during starting and whose output signal is applied to the input of a 3-bit counter Z. The three outputs of this counter Z are applied to a decoder D, which produces the drive signals U1, V1, W1 with reference to Table 1. The coding of the output signals of the counter Z is converted in the decoder in such a manner that three square-wave signals are produced, which are phase-shifted through 120°. The counter Z counts from 1 to 6, in a corresponding binary manner from 0 to 101, and is subsequently reset to 0 by a reset pulse RES. As can be seen from the Table 1, the period of oscillation of the symmetrical square-wave oscillations U1, V1, W1 is precisely 6 counting pulses long. The counting direction is indicated by the arrow on the table.

The regulating signal FG which is produced by the sensor GE (FIG. 1) is applied in the controller to a separator SEP, which produces trigger pulses TR for the generator P, and reset pulses RES for the counter Z. As can be seen from FIG. 2, the pulses of the regulating signal FG consist of eleven narrow square-wave pulses, and one broad square-wave pulse. Each of these pulses starts a trigger pulse TR in the separator SEP. The broad pulse is also regarded as a reset signal RES for the counter Z. This thus produces the counter value of binary 000 and thus corresponds to the start signal for each rotor revolution.

The sensor GE (FIG. 1), which is arranged on the motor, can be implemented, for example, optically by means of a light-emitting diode and a phototransistor whose optical connecting line is interrupted periodically by the rotor. The mechanical arrangement of the start pulse is in this case chosen such that a maximum efficiency is achieved at the rated rotation speed. Driving the motor with sinusoidal signals also results in better efficiency than driving it with square-wave signals.

Figure 5:
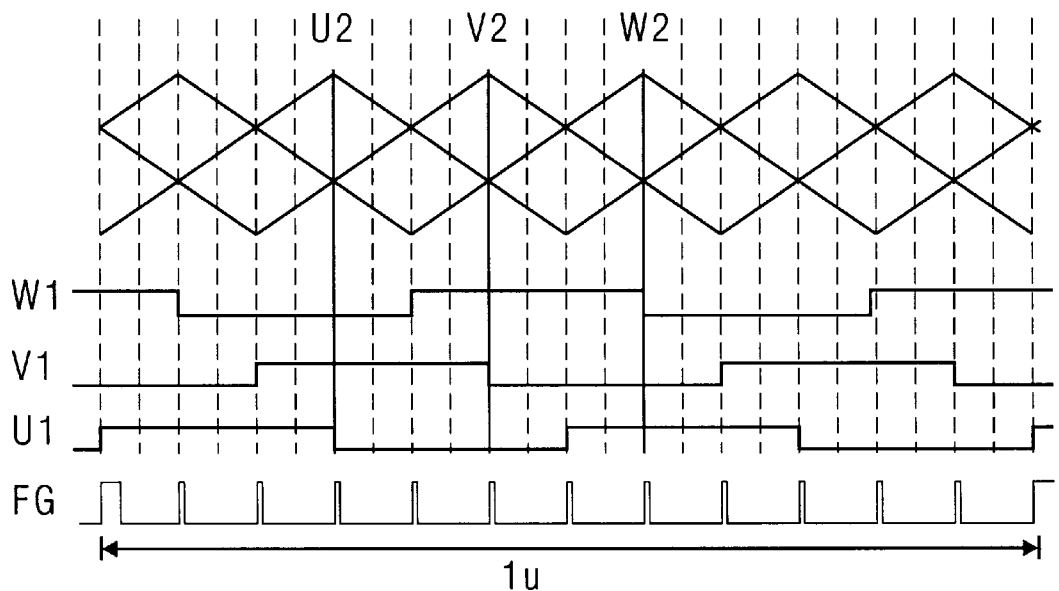
FIG. 5 shows a regulating signal and the three drive signals for the three phases of the synchronous motor, and Tab. 1 shows the code conversion of counter values in a decoder.

FIG. 5 illustrates how the drive signals U1, V1 and W1 are derived from the regulating signal FG. The edges of the drive signals U1, V1 and W1 are thus defined precisely by the rotor revolutions. Precise mechanical positioning of the optical sensor GEN results in the rotating field adopting an optimum lead angle with respect to the rotor, as a result of which the most favourable efficiency is achieved. At the rated rotation speed, there is a fixed phase relationship between the magnetic rotating field and the rotor. 12 pulses are thus produced during one rotor revolution, their phase separation being equidistant at 30°. FIG. 5 additionally illustrates the triangular waveform signals U2, V2 and W2 which are produced by the integrators I1, I2 and I3 (FIG. 1).

A single sensor GE is sufficient for all three drive signals. The optimum time for the start pulse can also optionally be set by the controller CON by means of a programmable delay. A programmable logic device (PLD) may be used, for example, as the controller, as is already available anyway in a video recorder. The circuit may either be integrated or may also be constructed from physically distributed individual components. The controller itself may also be constructed from individual components.

The synchronous motor may also have a number of coils S1, S2 and S3 other than three, so that the circuit must then have a corresponding number of drive signals. Each of the coils S1, S2 or S3 may also be split into a number of windings.

We claim:

1. Circuit providing sinusoidal signals driving a synchronous motor with a plurality of coils, said circuit comprising:
   a digital controller for driving said plurality of coils, said digital controller providing digital drive signals and a separate digital control signal which is pulse-width-modulated; and
   an integrator associated with each of said plurality of coils and operative to convert the drive signals of said controller into triangular waveform signals, and a multiplier associated with each coil for adjusting the amplitude of said triangular waveform signals responsive to said pulse-width modulated control signal.

2. Circuit according to claim 1, wherein the pulse-width-modulated control signal is used by the multiplier to chop the triangular waveform signal, and the harmonics which are produced as a consequence are filtered out by a subsequent low-pass filter.

3. Circuit according to claim 2, further comprising a sensor which is arranged on the synchronous motor to produce a regulating signal for regulating the synchronous motor, wherein said regulating signal allows the movement sequence of a rotor to be identified.

4. Circuit according to claim 3, wherein the sensor produces a plurality of digital regulating pulses per rotor revolution, and wherein one of the pulses, which is used as a start pulse for said rotor revolution, has a pulse width which is different from that of the other pulses.

5. Circuit according to claim 4, said controller further including a generator which produces a starting frequency for the starting of the motor and which is synchronized, during operation, by the regulating pulses of the sensor.

6. Circuit according to claim 5, said controller further including a 3-bit counter arranged downstream of the generator for counting pulses provided by the generator, and having output signals being converted by means of a decoder into said drive signals which are phase-shifted by 120° with respect to one another.

7. Circuit according to claim 6, wherein the start pulse resets the counter.

8. Circuit for the operation of a synchronous motor with several coils, said circuit comprising:

a digital controller for driving said coils, said digital controller providing digital drive signals and a separate digital control signal which is pulse-width-modulated for adjusting the amplitude of said drive signals, and for each coil:

an integrator which converts one of said drive signals of said controller into a triangular waveform signal, and a multiplier for adjusting the amplitude of said drive signal responsive to said pulse-width-modulated control signal to chop the drive signal; and, a low-pass filter coupled to said multiplier for filtering harmonics associated with said triangular waveform signal and said pulse-width-modulated control signal.

9. Circuit for the operation of a synchronous motor with several coils, said circuit comprising:

a digital controller for driving said coils, said digital controller providing digital drive signals and a separate digital control signal for adjusting the amplitude of said drive signals; and a digital-to-analog converter for converting said control signal to an analog control signal, and for each coil:

an integrator which converts a drive signal of said controller into a triangular waveform signal, and a multiplier for adjusting the amplitude of said drive signal responsive to said analog control signal.

10. Circuit according to claim 4, wherein the sensor produces 12 digital regulating pulses per rotor revolution.

11. Circuit according to claim 10, wherein said regulating pulses comprise square-wave pulses.

12. Circuit according to claim 10, wherein said multiplier comprises an analog multiplier.

13. Circuit according to claim 8, wherein said low-pass filter provides an analog sinusoidal signal whose amplitude is inversely proportional to the duty cycle of the pulse-width-modulated control signal.

14. Circuit according to claim 12, wherein said analog multiplier comprises a transistor for chopping said triangular waveform signal synchronous with said pulse-width-modulated control signal.

* * * * *